United States Patent [19]

Morello et al.

[11] 4,143,733
[45] Mar. 13, 1979

[54] HOOD PANEL SUPPORT STRUCTURE

[75] Inventors: Michael E. Morello, Sandwich; Thomas E. Cochran, Yorkville, both of Ill.

[73] Assignee: Caterpillar Tractor Co., Peoria, Ill.

[21] Appl. No.: 814,592

[22] Filed: Jul. 11, 1977

[51] Int. Cl.² ............................................. B62D 25/12
[52] U.S. Cl. ..................................... 180/69 R; 49/463
[58] Field of Search ................ 180/69 R, 69 C, 68.5, 180/64 R; 296/28 K, 37.6, 151, 148; 52/483, 488; 49/463, 464

[56] References Cited

U.S. PATENT DOCUMENTS

| | | | |
|---|---|---|---|
| 1,008,414 | 11/1911 | Jeavons | 49/463 |
| 2,963,132 | 12/1960 | Rosenbaum | 49/463 |
| 3,583,513 | 6/1971 | Macadam | 180/69 R |
| 3,630,003 | 12/1971 | Ashton et al. | 180/69 R |
| 3,786,891 | 1/1974 | Vogelaar et al. | 180/69 R |
| 3,789,945 | 2/1974 | Hansen | 180/69 R |
| 3,860,083 | 1/1975 | Yancey | 180/69 R |

*Primary Examiner*—David M. Mitchell
*Attorney, Agent, or Firm*—Sixbey, Bradford & Leedom

[57] ABSTRACT

A hood panel support structure for a sectionalized access opening closure panel of an engine compartment in a hood assembly and the like, including a unique fabricated structure which positions the panel sections, with cross beams having means upon which the panels are secured, and side beams incorporating resilient end mounting means, the structure presenting an aesthetically clean and neat appearance.

15 Claims, 7 Drawing Figures

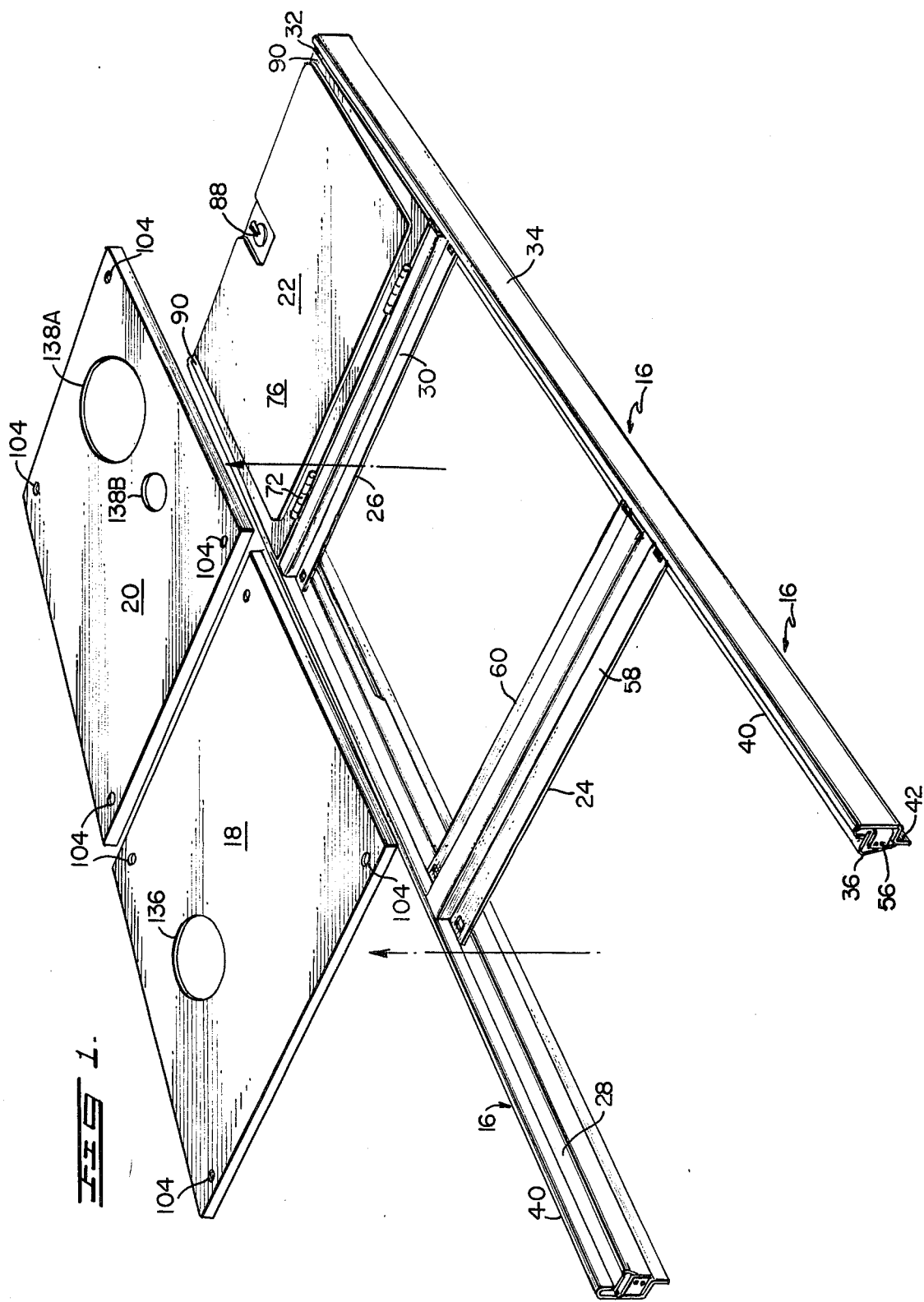

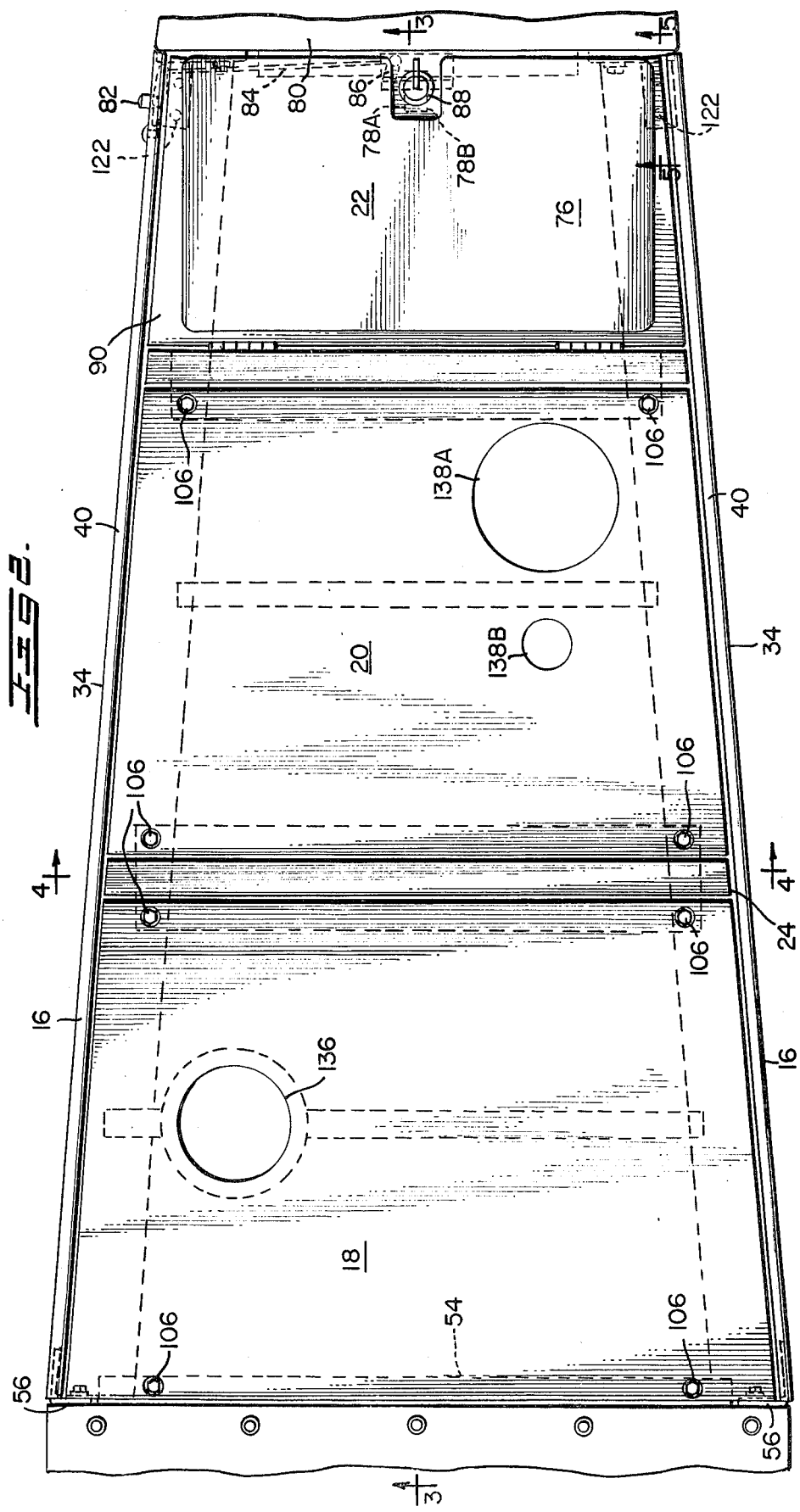

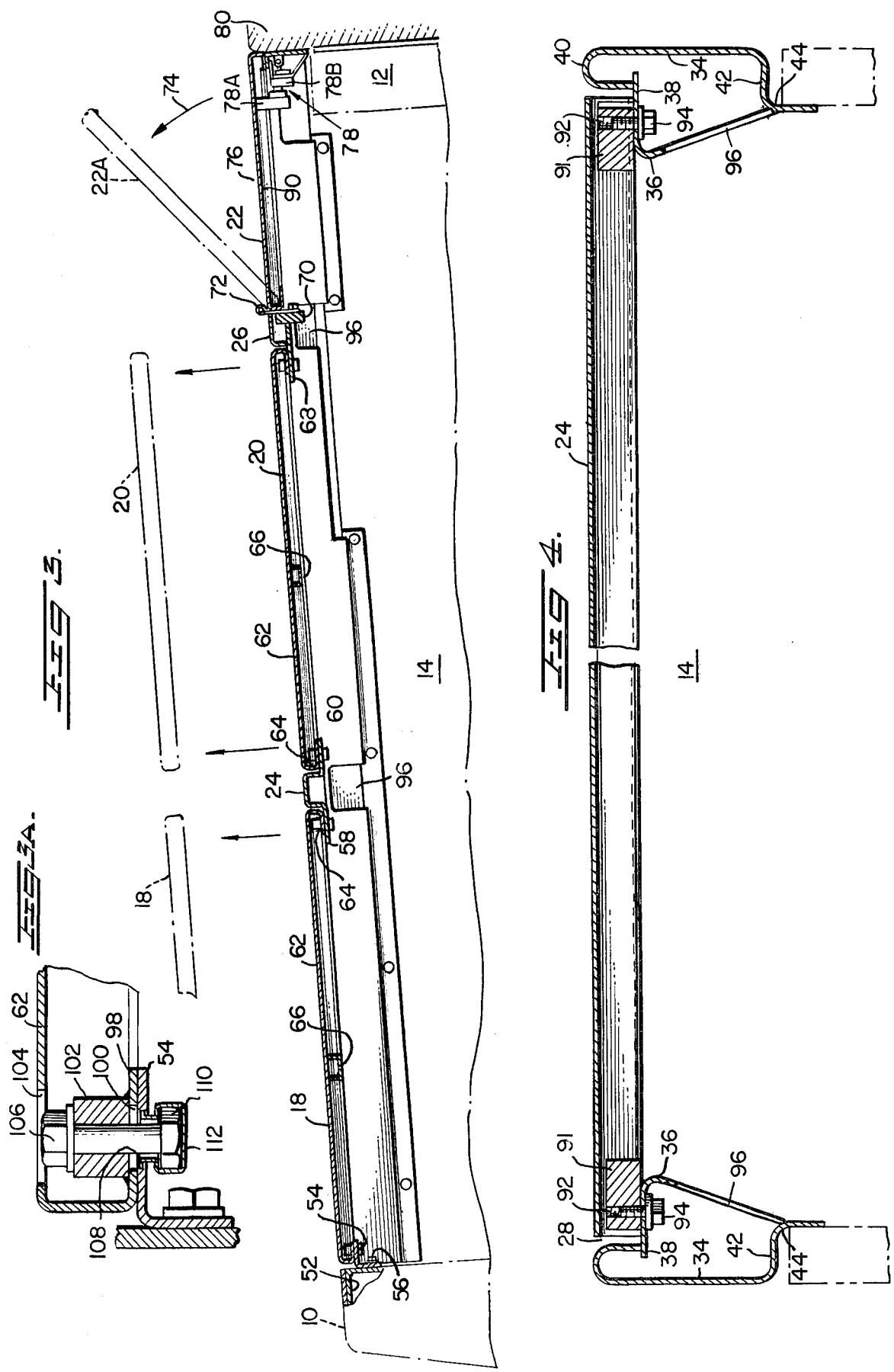

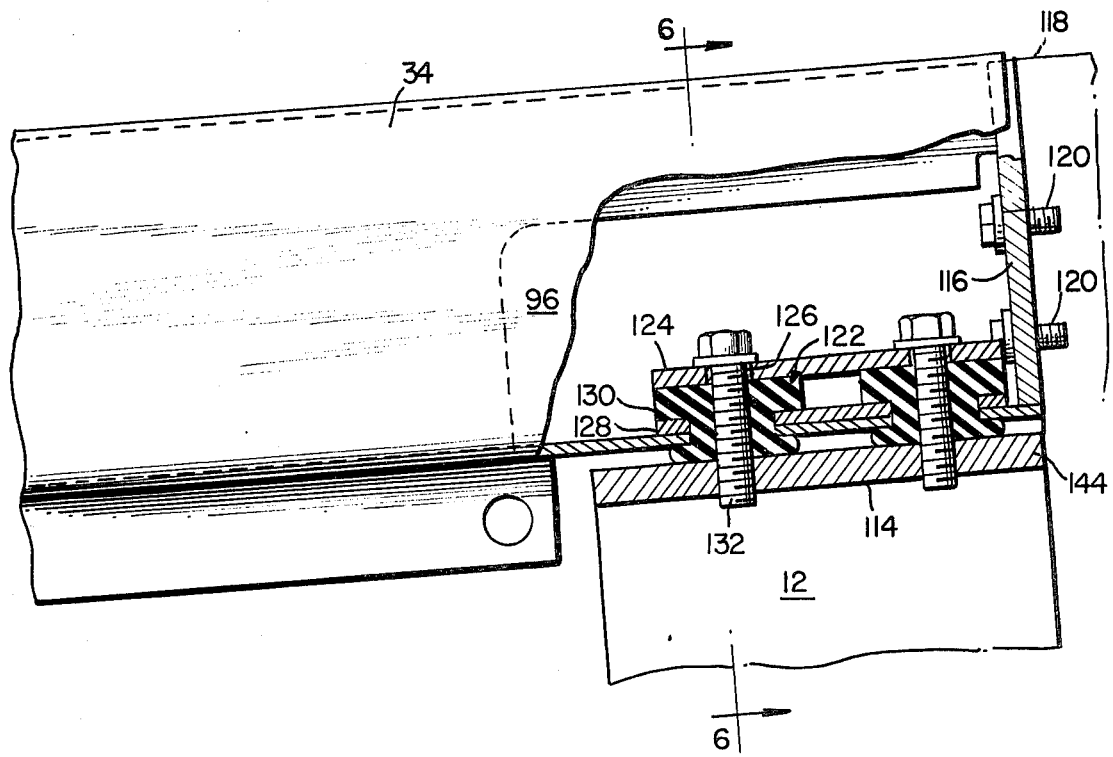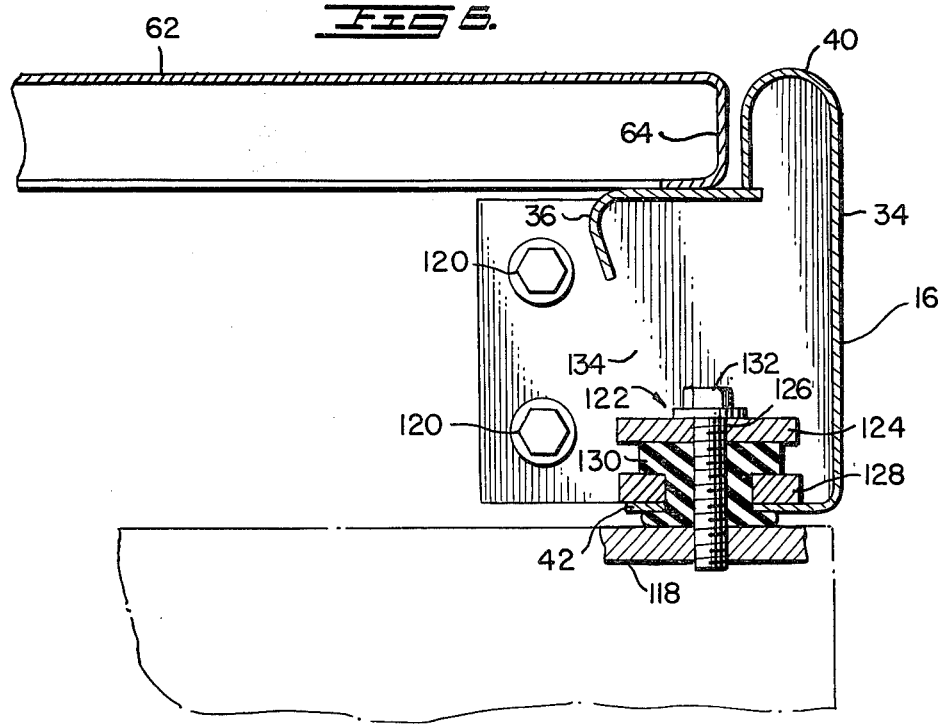

HOOD PANEL SUPPORT STRUCTURE

BACKGROUND OF THE INVENTION

This invention relates broadly to the fabrication and construction of a hood assembly, and engine compartment access panels, for wheeled vehicles and the like in the nature of construction, earth working, etc., vehicles, including but certainly not limited to wheeled front end loaders, wheel loaders generally, wheeled dozers, wheel compactors, sanitary land fill compactors, and the like.

The invention is concerned broadly with engine enclosures for vehicles of this type wherein, as is well known, the engine structures are sizeable and certain problems have in the past arisen regarding noise, and because of dust, dirt, and other contaminant materials entering into the compartment. The invention is concerned with apparatus structure to permit access to be readily obtained to the engine compartment for maintenance, service and repair of the engine therein.

The noise and/or vibration resulting from engine size and operation in vehicles of this type create substantial problems, and their diminution or elimination, if possible, are greatly desired features.

It is desired, as applied to engine enclosure assemblies, to provide in the enclosure, a fabricated structure which will position the hood panels efficiently and effectively, with the structure including only two longitudinal side beams and a plurality of cross beams, the cross beams incorporate means upon which hood panel sections are secured, and resilient mounting means are positioned at each end of the side beams to reduce vibration and noise.

The structural members preferably should be all securely interconnected to provide structural integrity and strength to the machine, and a clean and neat external aesthetic appearance is also desired.

More specifically improvements are desirable as directed to a fabricated support and mounting structure for facilitating mounting of sectionalized access opening closure panels, which are removable for purposes of access into an engine containing compartment in a hood assembly, and the present invention is designed to provide a very efficient structure of this nature having simplicity, ease of mounting and removal of sectionalized panels, and additionally incorporating means for efficiently and effectively diminishing noise and/or vibrations resulting from the usual engine type associated with equipment of this nature.

DESCRIPTION OF THE PRIOR ART

Heretofore, particularly referring to engine enclosure assemblies in wheeled vehicles of the earth moving, construction, etc., types, engine compartment enclosure panels have been provided attempting to prevent, insofar as possible, entrance of deleterious materials into an engine enclosure, and additionally panels have attempted to incorporate sound diminution means therein. Many such panels were of substantial size, some consisting of single entity complete access panel opening closures, and these were of substantial weight, difficult of manipulation, and especially by single personnel under field operating conditions. Such panels additionally were difficult to insert or remove, and did not provide pleasing aesthetic appearances to the vehicle.

In some previously known constructions of large engine compartment access panels, where efforts were made for lightness by use of metal sheet material, the panels were subject to undesired bending, warping, damage from other external sources, or damage which might result during removal or installation of the panels due to unfavorable work areas encountered and operating conditions.

The assignee company of the inventors has for a long period of time been operating very efficiently in the field of design, manufacture, sale and maintenance of heavy equipment of earth working or construction types, and the problems of access to engine compartments have been in existence for a long period of time, as also has the problem of providing efficient access opening panel closure means therefor. The company, while having been aware of such existing constructions, has sought for a substantial period of time to create an innovative structure differing from the old units and which would overcome difficulties heretofore encountered.

The present invention accordingly is directed basically to providing, in an engine enclosure assembly, a sectionalized access opening closure panel, the individual panel sections being easily and readily separately either removed or replaced, the overall panel including a plurality of such panel sections.

A still more specific object of the invention is to provide a hood panel support structure for a sectionalized access opening closure panel for an engine compartment in a hood assembly, which incorporates a fabricated structure used to facilitate positioning of hood panel sections, and wherein the structure includes only two horizontally extending side beams and a plurality of cross beams. The side beams and the cross beams provide means upon which the hood panels are secured, and the side beams additionally function to guide replacement of panel sections, the construction of the side beams also lending strength and aesthetic appearance appeal to the structure.

A still further specific object of the invention is to provide in a structure of the type involved, resilient mounting means in conjunction with the side beams to diminish insofar as possible noise and vibration factors.

The overall end structure of the invention provides secure mounting and fastening means for the individual panel sections, with overall structural integrity, and an overall aesthetically appealable clean neat appearance.

Additional objects, features and advantages of the invention will be more readily apparent from the following detailed description of an embodiment thereof, when taken together with the accompanying drawings in which:

FIG. 1 is an exploded perspective view of the structure comprising the present invention;

FIG. 2 is a fragmentary top plan view of the structure of FIG. 1 and support structure, with related vehicle components;

FIG. 3 is a longitudinal detailed sectional view taken along line 3—3 of FIG. 2;

FIG. 3A is a fragmentary enlarged, partially sectionally view, showing in detail securement and mounting means for a panel section;

FIG. 4 is a transverse detailed sectional view taken along line 4—4 of FIG. 2;

FIG. 5 is an enlarged detailed fragmentary sectional view taken along line 5—5 of FIG. 2; and FIG. 6 is a sectional view of resilient mounting means, taken at a right angle to the showing of FIG. 5, and along the line 6—6 of FIG. 5.

DETAILED DESCRIPTION OF THE INVENTION

Referring now in detail to the drawings, reference is made initially to FIG. 3 wherein a vehicle radiator guard 10 is fragmentarily shown, as also a firewall 12 which, as is usual, is interposed between an engine, not shown, mounted in an engine compartment generally designated 14 and the operating control area of the vehicle. The showing of this Figure provides a setting for the present invention in that an access opening is provided for the engine compartment to provide access thereinto for working on the engine of the vehicle. In the present instance the access opening to the engine compartment is a top opening, and the present invention is directed to a sectionalized access opening closure panel for the engine compartment in the hood assembly.

The invention more specifically resides in the unique fabricated structure which serves to position and support the individual panel sections constituting the composite closure panel for the compartment. Turning now to FIG. 1, for example, this fabricated support structure includes two longitudinal side rails, generally designated 16, and it will be noted that only two such longitudinal members are utilized. As shown the present structure incorporates three panel sections, generally designated 18, 20 and a hinged panel 22. Two cross beams 24 and 26 are interconnected to and between the longitudinal side rails in a manner hereinafter to be described. The structure of the longitudinal and transverse members, i.e., the longitudinal side rails 16 and cross beams 24 and 26, essentially provides a recess 28 for panel 18, a recess 30 for panel 20, and recess 32 for hinged panel 22.

The longitudinal side rails, referring to FIG. 4, include a rail 34, to which is affixed an angle 36, which latter has a horizontal web or flange portion 38 which serves as a support ledge as hereinafter described. The top of rail 34 is gently bent over in the nature of a reentrant angle, and in effect constituting a curvilinear nose portion 40 which will serve not only as a stiffening means or portion but at the same time, due to the configuration, will constitute a guide for placement or dropping in of the panels into the recessed areas provided therefor. The lower edge of this nose portion is welded to the upper surface of the horizontal web or support ledge 38. The lower portion of rail 34 has a horizontal inturned web portion 42, and a downwardly depending web portion 44 for engaging side panels of a usual structure in vehicles of the type in question are shown fragmentarily at 46.

The radiator guard 10 includes a structural angle member 52 to which is attached a support ledge angle 54 by means of a bolt 56 or the like. The cross beam 24 is in the configuration of a hat shape, as seen in FIG. 3 for example, with support flanges or webs 58 and 60 extending outwardly from a raised central portion, and these webs serve as supports for the individual panel sections.

The panel sections 18 and 20 are formed of sheet metal having generally planar tops shown at 62, with the peripheral edges bent down and under into a generally inturned U-shaped configuration indicated at 64, with the lower or undermost portion being adapted to rest on the upper surfaces of the support webs 58 and 60. It will be noted that panel section 18 at one end rests on web 58, and the rearward end rests on support ledge 54. The support ledges 38 of the side rails constitute a base or support for the longitudinal edges of the panel sections. The underside of the panel sections 18 and 20 are each provided with a reinforcing U-shaped member 66 welded to the under surface thereof and/or the inturned peripheral side portions.

Referring to panel 20, the rearward end thereof rests upon the support flange or web 60. The cross beam 26 in effect is of a half hat shape and has a ledge portion 68 on which the forward end of panel section 20 rests. The forward end portion of cross beam 26 has a reinforcing plate 70 welded thereto, which serves as a hinge mount for hinge plate 72. Hinged panel 22 has the rear end thereof constituting a second hinge half which permits a rotation or pivoting of panel 22 from the full line position shown in FIG. 3 to the broken line position indicated at 22A in this figure, the movement being indicated by arrow 74. This hinged panel has a raised central boss or the like 76, for strengthening purposes.

At the forward portion of panel 22 there is mounted a securing latch generally designated 78, of which a portion 78A is attached or fixed to the hinged panel 22, and the other portion 78B is secured or fixed to frame 80 of the vehicle. As shown in FIG. 2 a latch operating button 82 extends from the side of the hood and is interconnected by means of lever arm 84 to latch lever 86 which, upon actuation, serves to disconnect the latch portions and permit panel 22 to be raised by lift ring 88. It is to be noted that the base plate portion 90 of hinged panel 22 is conformed to the shape of the recess provided therefor, and centrally thereof is the boss portion thereof.

Structural strengthening means for the cross beams can be seen in FIG. 4. Blocks 91 are welded, one at each end of the cross beam 24, to the interior thereof and these blocks have internally threaded bores 92 into which bolts 94 threadedly engage, after passing through holes provided for this purpose in the support ledges 38. The angle portion 36 of each side rail is provided with an opening 96 to permit a wrench to be inserted therethrough for tightening of bolts 94 for securement of the panels.

Structure for securement of the four corners of panels 18 and 20 is shown in detail in FIG. 3A. The lower inturned edge 98 of the U-shaped edges are provided with openings 100 above which is superposed an apertured post 102. The upper surface 62 has an opening 104 therein. The support ledge 54, shown in FIGS. 3 and 3A, is a portion of the angle affixed to the radiator guard structure. A bolt 106 extends through hole 108 formed in the ledge as shown in FIG. 3A, the bolt 106 extending through the hole after being inserted through opening 104, and a nut 110 is operatively positioned by means of keeper 112. While the previous description refers to the securing of panel 18 to the radiator guard, it will be understood from viewing FIG. 2 that like mountings are provided at the four corners of each panel 18 and 20 to the flanges 58 and 60 of the cross beams 24 and 26.

As previously mentioned, the present invention includes means for damping vibration or noise. Reference is here made to FIGS. 5 and 6. A plate 114 is mounted above fire wall 12 and has threaded bores therein. A plate 116 is mounted to the frame 118 by bolts 120 and conforms to the configuration of the rail cross section. A resilient mounting means, in the nature of shock absorbing means, generally designated 122, includes a compression plate 124 having openings 126 therethrough. A lower apertured plate 128 is superposed on the flange 42 of the longitudinal rail 34 as shown, resilient members 130 are engaged between plates 124 and 128 with bolts 132 operatively engaging and mounting the shock absorbing means to the threaded bores of plate 114 previously described. The structure is in the nature of an automobile engine mount and serves to dampen noise and/or vibrations which might otherwise result, as might be anticipated, from the engine. An access opening 134 is provided for access to the bolt 132.

It will accordingly be seen that the desired functions and operation are provided in the structure, with the recessed securement means at the four corners of the panels 18 and 20, and the recesses 28, 30 and 32 for the individual panels providing for a flush upper surface for the overall access opening panel closure, with the individual panel sections being separately removable for access into different areas of the engine compartment.

Panel 18 is provided with an exhaust stack opening at 136, and panel 20 is provided with openings 138A and 138B for the normal filter and the like.

While a preferred embodiment of the invention has been shown and described, manifestly minor changes in details of construction can be effected without departing from the spirit and the scope of the invention, as defined in, and limited solely by the appended claims.

What is claimed is:

1. A hood panel support structure for a vehicle engine compartment access opening closure, wherein said closure includes a plurality of separate hood panels, mounting and support means for said panels including laterally spaced longitudinal side beam members and a plurality of longitudinally spaced cross beam members operatively attached at the ends thereof to said side beam members, said side beam members respectively including an outer rail portion having an upper nose portion, a horizontal inturned web portion, and a downward flange adapted for operatively mounting said side beam members to a frame of the vehicle, said side beam members further including an angle portion secured at the bottom thereof to said rail portion and having a horizontal flange spaced below the top of said nose portion, said horizontal flange constituting a mount for said cross beams, said cross beams including a horizontal web below the top thereof, said horizontal flanges of said side beam angle portions and said horizontal webs of said cross beams comprising coacting mounting and support means for said panels in a plurality of recessed panel positioning and support compartments in a longitudinal array, and said panels being individually and separately removably inserted and secured in said recessed compartments.

2. A hood panel support structure as claimed in claim 1, an end one of said panels being hingedly mounted by hinge means attached to a vertical portion of a cross beam member and an edge of said hinged panel respectively, the opposite end of the hinged panel having partial latch means operatively connected thereto, coactive latch means positioned and mounted on frame structure of said vehicle, said coactive latch means including controlled means for release thereof and permitting a subsequent pivotting of the hinged panel to an open position and providing access in that region to said engine compartment.

3. A hood panel support as claimed in claim 2, said hinged panel having a strengthening raised boss centrally disposed on the upper surface thereof.

4. A hood panel support as claimed in claim 2, said hinge being disconnectable from said vertical portion of said cross beam member to thereby permit vertical removal of said hinged panel together with said hinge from the support to obtain unobstructed access to this region of the engine compartment.

5. A hood panel support as claimed in claim 1, said horizontal flange of said side beam having an opening therethrough, said cross beam members having securement blocks interiorally positioned therein and secured thereto, said blocks having threaded bores therein, threaded attachment bolts inserted through said opening into said threaded bore in said blocks in said cross beam members, and securely attaching said cross members to said side members, said angle having openings therethrough proximate said bolts adapted for operational insertion of a wrench therethrough for securement and or removal of said bolt.

6. A hood panel support as claimed in claim 1, and including resilient mounting means for at least one end of each said side beam member adapted to attach said side beam member to said engine compartment and operable to dampen vibration and noise in the composite structure.

7. A hood panel support structure as claimed in claim 6, said resilient means including a hole through the horizontal inturned web portion of said side rail, an apertured mounting plate positioned on the upper surface of the inturned flange and mating with said opening, an apertured resilient insert being positioned and extending through said openings, a compression plate mounted above said resilient member and having an opening therethrough, and a frame member of the vehicle therebelow having a threaded bore therein, a threaded bolt extending through all said mating openings and secured in said threaded bore for compressing said resilient member in operative position.

8. A hood panel support structure as claimed in claim 1, wherein each said panel is formed of sheet metal and having the periphery thereof double bent to form a substantially U-shaped peripheral edge, apertured posts positioned and secured in said U-shaped edge at positions proximate the four corners of the panels, the inturned edge of the U-shape and the horizontal web of the cross beam member having mating holes, and securing means including bolts extending through said holes, and nuts threadedly engaged on said bolts for securement of said panels.

9. A hood panel support as claimed in claim 8, a support and mounting angle brace adapted to be secured to the radiator guard structure of the vehicle, a vertical web on said angle secured to said radiator guard structure, a horizontal web portion on the angle and the inturned edge of the U-shaped end of a panel adjacent thereto having mating openings, an apertured post mounted within the U-shaped portion and secured therein, the aperture being positioned over the mating openings therebelow, a threaded end bolt positioned with the shank extending through said mating openings and aperture, a positioning keeper supporting and coacting with a nut to position the nut for coacting with the threaded end of said bolt for securement of said panel to said radiator guard, said panel having openings through the top surface thereof for access to said bolts.

10. A hood panel support structure for an engine compartment access opening closure of a vehicle, wherein said closure includes a plurality of separate hood panels, mounting and support means for said panels including laterally spaced longitudinal side beam members and a plurality of cross beam members operatively attached at the ends thereof to said side beam members, said side beam members and said cross beam members including substantially vertical and substantially horizontal recessed web portions, said web portions conjointly defining panel positioning and support recesses in a longitudinal array, said panels being individually and separately removably inserted in said recesses with the top surfaces of said panels and the upper surfaces of all said beam members lying substantially in a common plane, securement means separately and removably attaching said panels in said recesses, an end of one of said panels being hingedly mounted by hinge means attached to a vertical portion of a cross beam member and an edge of said hinged panel respectively, the opposite end of the hinged panel having partial latch means operatively connected thereto, coactive latch means positioned and mounted on frame structure of said vehicle, said coactive latch means including controlled means for release thereof and permitting a subsequent pivoting of the hinged panel to an open position and providing access in that region to said engine compartment.

11. A hood panel support structure as claimed in claim 10, wherein each said panel is formed of sheet metal and having the periphery thereof double bent to form a substantially U-shaped peripheral edge, apertured posts positioned and secured in said U-shaped edge at positions proximate the four corners of the panels, the inturned edge of the U-shape and the horizontal web of the cross beam member having mating holes, said securement means including bolts extending through said holes, and nuts threadedly engaged on said bolts for securement of said panels.

12. A hood panel support as claimed in claim 11, a support and mounting angle brace adapted to be secured to the radiator guard structure on said vehicle, a vertical web of the angle secured to said radiator guard structure, a horizontal web portion on the angle and the inturned edge of the U-shaped end of a panel adjacent thereto having mating openings, an apertured post mounted within the U-shaped portion and secured therein, the aperture being positioned over the mating openings therebelow, a threaded end bolt positioned with the shank extending through said mating openings and aperture, a positioning keeper supporting and coacting with a nut to position the nut for coacting with the threaded end of said bolt for securement of said panel to said radiator guard, said panel having openings through the top surface thereof for access to said bolts.

13. A hood panel support structure as claimed in claim 10, an end one of said panels being hingedly mounted by hinge means attached to a vertical portion of a cross beam member and an edge of said hinged panel respectively, the opposite end of the hinged panel having partial latch means operatively connected thereto, coactive latch means positioned and mounted on frame structure of said vehicle, said coactive latch means including controlled means for release thereof and permitting a subsequent pivotting of the hinged panel to an open position and providing access in that region to said engine compartment.

14. A hood panel support as claimed in claim 13, said hinged panel having a strengthening raised boss centrally disposed on the upper surface thereof.

15. A hood panel support as claimed in claim 13, said hinge being disconnectable from said vertical portion of said cross beam member to thereby permit vertical removal of said hinged panel together with said hinge from the support to obtain unobstructed access to this region of the engine compartment.

* * * * *